United States Patent [19]
Adams et al.

[11] Patent Number: 6,117,941
[45] Date of Patent: Sep. 12, 2000

[54] INTERMEDIATES USEFUL FOR PREPARING DISPERSANT-VISCOSITY IMPROVERS FOR LUBRICATING OILS

[75] Inventors: Paul E. Adams, Willoughby Hills; Richard M. Lange, Euclid; Richard Yodice, Mentor; Mark R. Baker, Lyndhurst; Jeffry G. Dietz, University Heights, all of Ohio

[73] Assignee: The Lubrizol Corporation, Wickliffe, Ohio

[21] Appl. No.: 09/057,850

[22] Filed: Apr. 9, 1998

Related U.S. Application Data

[60] Provisional application No. 60/051,011, Jun. 5, 1997.

[51] Int. Cl.$^7$ .................................................. C08F 255/00
[52] U.S. Cl. ......................... 525/55; 525/303; 525/236; 525/241; 525/314; 525/98; 525/99; 525/280; 525/284; 525/285; 508/459
[58] Field of Search .............................. 525/55, 303, 236, 525/241, 314, 98, 99, 280, 284, 285; 508/459

[56] References Cited

U.S. PATENT DOCUMENTS

| | | | |
|---|---|---|---|
| 4,412,031 | 10/1983 | Kitahara et al. | 524/526 |
| 4,412,041 | 10/1983 | Kitahara et al. | 525/154 |
| 4,517,104 | 5/1985 | Bloch et al. | 252/51.5 A |
| 4,525,541 | 6/1985 | Kitahara et al. | 525/337 |
| 4,632,769 | 12/1986 | Gutierrez et al. | 252/48.6 |
| 4,654,435 | 3/1987 | Kitahara et al. | 560/61 |
| 4,670,173 | 6/1987 | Hayashi et al. | 252/51.5 A |
| 5,035,821 | 7/1991 | Chung et al. | 252/51.5 A |
| 5,049,294 | 9/1991 | Van Zon et al. | 252/51.5 A |
| 5,147,570 | 9/1992 | Van Zon et al. | 525/301 |
| 5,274,051 | 12/1993 | Brois et al. | 525/383 |
| 5,856,279 | 1/1999 | Baker | 508/454 |

FOREIGN PATENT DOCUMENTS

| | | |
|---|---|---|
| 0449374A2 | 10/1991 | European Pat. Off. . |
| 0364058A2 | 2/1997 | European Pat. Off. . |
| 0759435A2 | 2/1997 | European Pat. Off. . |
| 0759443A2 | 2/1997 | European Pat. Off. . |
| 0759444A2 | 2/1997 | European Pat. Off. . |

*Primary Examiner*—James J. Seidleck
*Assistant Examiner*—Olga Asinovsky
*Attorney, Agent, or Firm*—Joseph P. Fischer; David M. Shold

[57] ABSTRACT

Compositions comprising reaction product of higher molecular weight olefinic reactants with carboxylic reactants of the formula $R^3C(O)(R^4)_nC(O)OR^5$ (IV) or the corresponding acetals, hemiacetals, ketals, and hemiketals thereof are useful as intermediates for further reaction in the preparation of lubricating oil additives.

43 Claims, No Drawings

INTERMEDIATES USEFUL FOR PREPARING DISPERSANT-VISCOSITY IMPROVERS FOR LUBRICATING OILS

This application claims the benefit of U.S. Provisional Application No.: 60/051011 filing date Jun. 5, 1997.

FIELD OF THE INVENTION

This invention relates to intermediates useful for preparing dispersant-viscosity improvers for lubricating oils and processes for preparing them.

BACKGROUND OF THE INVENTION

The viscosity of lubricating oils, particularly the viscosity of mineral oil based lubricating oils, is generally dependent upon temperature. As the temperature of the oil is increased, the viscosity usually decreases.

The function of a viscosity improver is to reduce the extent of the decrease in viscosity as the temperature is raised or to reduce the extent of the increase in viscosity as the temperature is lowered, or both. Thus, a viscosity improver ameliorates the change of viscosity of an oil containing it with changes in temperature. The fluidity characteristics of the oil are improved.

Viscosity improvers are usually polymeric materials and are often referred to as viscosity index improvers.

Dispersants are also well-known in the lubricating air. Dispersants are employed in lubricants to keep impurities, particularly those formed during operation of mechanical devices such as internal combustion engines, automatic transmissions, etc. in suspension rather than allowing them to deposit as sludge or other deposits on the surfaces of lubricated parts.

Multifunctional additives that provide both viscosity improving properties and dispersant properties are likewise known in the art. Such products are described in numerous publications including Dieter Klamann, "Lubricants and Related Products", Verlag Chemie Gmbh (1984), pp 185–193; C. V. Smalheer and R. K. Smith "Lubricant Additives", Lezius-Hiles Co. (1967); M. W. Ranney, "Lubricant Additives", Noyes Data Corp. (1973), pp 92–145, M. W. Ranney, "Lubricant Additives, Recent Developments", Noyes Data Corp. (1978), pp 139–164; and M. W. Ranney, "Synthetic Oils and Additives for Lubricants", Noyes Data Corp. (1980), pp 96–166. Each of these publications is hereby expressly incorporated herein by reference.

Dispersant-viscosity improvers are generally prepared by functionalizing, i.e., adding polar groups, to a hydrocarbon polymer backbone.

Hayashi, et al, U.S. Pat. No. 4,670,173 relates to compositions suitable for use as dispersant-viscosity improvers made by reacting an acylating reaction product which is formed by reacting a hydrogenated block copolymer and an alpha-beta olefinically unsaturated reagent in the presence of free-radical initiators, then reacting the acylating product with a primary amine and optionally with a polyamine and a mono-functional acid.

Chung et al, U.S. Pat. No. 5,035,821 relates to viscosity index improver-dispersants comprised of the reaction products of an ethylene copolymer grafted with ethylenically unsaturated carboxylic acid moieties, a polyamine having two or more primary amino groups or polyol and a high functionality long chain hydrocarbyl substituted dicarboxylic acid or anhydride.

Van Zon et al, U.S. Pat. No. 5,049,294, relates to dispersant/VI improvers produced by reacting an alpha,beta-unsaturated carboxylic acid with a selectively hydrogenated star-shaped polymer then reacting the product so formed with a long chain alkane-substituted carboxylic acid and with a $C_1$ to $C_{18}$ amine containing 1 to 8 nitrogen atoms and/or with an alkane polyol having at least two hydroxy groups or with the preformed product thereof.

Bloch et al, U.S. Pat. No. 4,517,104, relates to oil soluble viscosity improving ethylene copolymers reacted or grafted with ethylenically unsaturated carboxylic acid moieties then with polyamines having two or more primary amine groups and a carboxylic acid component or the preformed reaction product thereof.

Gutierrez et al, U.S. Pat. No. 4,632,769, describes oil-soluble viscosity improving ethylene copolymers reacted or grafted with ethylenically unsaturated carboxylic acid moieties and reacted with polyamines having two or more primary amine groups and a $C_{22}$ to $C_{28}$ olefin carboxylic acid component.

Each of these patents is hereby expressly incorporated herein by reference.

For additional disclosures concerning multi-purpose additives and particularly viscosity improvers and dispersants, the disclosures of the following United States patents are incorporated herein by reference:

| | | |
|---|---|---|
| 2,973,344 | 3,488,049 | 3,799,877 |
| 3,278,550 | 3,513,095 | 3,842,010 |
| 3,311,558 | 3,563,960 | 3,864,098 |
| 3,312,619 | 3,598,738 | 3,864,268 |
| 3,326,804 | 3,615,288 | 3,879,304 |
| 3,403,011 | 3,637,610 | 4,033,889 |
| 3,404,091 | 3,652,239 | 4,051,048 |
| 3,445,389 | 3,687,849 | 4,234,435 |

Many such additives are frequently derived from carboxylic reactants, for example, acids, esters, anhydrides, lactones, and others. Specific examples of commonly used carboxylic compounds used as intermediates for preparing lubricating oil additives include alkyl-and alkenyl substituted succinic acids and anhydrides, polyolefin substituted carboxylic acids, aromatic acids, such as salicylic acids, and others. Illustrative carboxylic compounds are described in Meinhardt, et al, U.S. Pat. No. 4,234,435; Norman et al, U.S. Pat. No. 3,172,892; LeSuer et al, U.S. Pat. No. 3,454,607, and Rense, U.S. Pat. No. 3,215,707.

Kitihara et al in U.S. Pat. Nos. 4,412,031 and 4,412,041 describe modified rubber compositions having improved green strength obtained by reacting an unsaturated rubber with an organic compound having a carboxyl group and an aldehyde group in the presence of an acid catalyst.

In U.S. Pat. No. 4,525,541, Kitihara et al describe a method for modifying a rubber having an unsaturated carbon bond which comprises reacting the rubber with an organic compound represented by the general formula

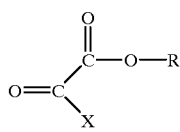

wherein —R represents a hydrocarbon group, and —X is —H, —CN or

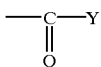

in which —Y represents an organic grouping, in the presence of a Lewis acid.

Kitihara et al in U.S. Pat. No. 4,654,435 describe a process for the addition reaction of an unsaturated organic compound, except a rubber, having at least one carbon to carbon double bond in a molecule, which comprises reacting the unsaturated organic compound with an organic compound having a carboxyl group and an aldehyde group in the presence of a Lewis acid.

European patent publications EP 0759443, EP 0759444 and EP 0759435, all assigned to The Lubrizol Corporation, describe reactions of olefinic compounds with omega-oxoalkanoic acids and certain reactive derivatives thereof.

Many carboxylic intermediates used in the preparation of lubricating oil additives contain chlorine. While the amount of chlorine present is often only a very small amount of the total weight of the intermediate, the chlorine frequently is carried over into the carboxylic derivative which is desired as an additive. For a variety of reasons, including environmental reasons, the industry has been making efforts to reduce or to eliminate chlorine from additives designed for use as lubricant or fuel additives.

Accordingly, it is desirable to provide low chlorine or chlorine free intermediates which can be used to. prepare low chlorine or chlorine free derivatives for use in lubricants and fuels.

A further object is to provide processes for preparing such an intermediate.

Other objects will in part be obvious in view of this disclosure and will in part appear hereinafter.

SUMMARY OF THE INVENTION

The present invention relates to a composition comprising the reaction product of (A) at least one olefinically unsaturated hydrocarbon polymer having $\overline{M}_n$ ranging from about 20,000 to about 500,000, when the polymer is not a star polymer, and up to about GPC peak molecular weight of 4,000,000 when the polymer is a star polymer, with (B) at least one carboxylic reactant selected from the group consisting of compounds of the formula $$R^3C(O)(R^4)_nC(O)OR^5 \quad\quad\quad (IV)$$

wherein each of $R^3$ and $R^5$ is independently H or a hydrocarbyl group, $R^4$ is a divalent hydrocarbylene group, and n is 0 or 1, and reactive sources thereof.

DETAILED DESCRIPTION OF THE PREFERRED EMBODIMENTS

As used herein, the terms "hydrocarbon", "hydrocarbyl" or "hydrocarbon based" mean that the group being described has predominantly hydrocarbon character within the context of this invention. These include groups that are purely hydrocarbon in nature, that is, they contain only carbon and hydrogen. They may also include groups containing substituents or atoms which do not alter the predominantly hydrocarbon character of the group. Such substituents may include halo-, alkoxy-, nitro-, etc. These groups also may contain hetero atoms. Suitable hetero atoms will be apparent to those skilled in the art and include, for example, sulfur, nitrogen and oxygen. Therefore, while remaining predominantly hydrocarbon in character within the context of this invention, these groups may contain atoms other than carbon present in a chain or ring otherwise composed of carbon atoms provided that they do not adversely affect reactivity or utility of the process or products of this invention.

In general, no more than about three non-hydrocarbon substituents or hetero atoms, and preferably no more than one, will be present for every 10 carbon atoms in the hydrocarbon or hydrocarbon based groups. Most preferably, the groups are purely hydrocarbon in nature, that is, they are essentially free of atoms other than carbon and hydrogen.

Throughout the specification and claims the expression oil soluble or dispersible is used. By oil soluble or dispersible is meant that an amount needed to provide the desired level of activity or performance can be incorporated by being dissolved, dispersed or suspended in an oil of lubricating viscosity. Usually, this means that at least about 0.001% by weight of the material can be incorporated into a lubricating oil. For a further discussion of the terms oil soluble and dispersible, particularly "stably dispersible", see U.S. Pat. No. 4,320,019 which is expressly incorporated herein by reference for relevant teachings in this regard.

The expression "lower" is used throughout the specification and claims. As used herein to describe various groups, the expression "lower" is intended to mean groups containing no more than 7 carbon atoms, more often, no more than 4, frequently one or two carbon atoms.

(A) The Olefinically Unsaturated Hydrocarbon Polymer

As used herein, the expression 'polymer' refers to polymers of all types, i.e., homopolymers and copolymers. The term homopolymer refers to polymers derived from essentially one monomeric species; copolymers are defined herein as being derived from 2 or more monomeric species.

The hydrocarbon polymer is an essentially hydrocarbon based polymer, usually one having a number average molecular weight ($\overline{M}_n$) between about 20,000 and 500,000, often from about 20,000 to about 300,000. Molecular weights of the hydrocarbon polymer are determined using well known methods described in the literature. Examples of procedures for determining the molecular weights are gel permeation chromatography (GPC) (also known as size-exclusion chromatography) and vapor phase osmometry (VPO). These and other procedures are described in numerous publications including:

P. J. Flory, "Principles of Polymer Chemistry", Cornell University Press (1953), Chapter VII, pp 266–316, "Macromolecules, an Introduction to Polymer Science", F. A. Bovey and F. H. Winslow, Editors, Academic Press (1979), pp 296–312, and W. W. Yau, J. J. Kirkland and D. D. Bly, "Modern Size Exclusion Liquid Chromatography", John Wiley and Sons, New York, 1979.

Unless otherwise indicated, GPC molecular weights referred to herein are polystyrene equivalent weights, i.e., are molecular weights determined employing polystyrene standards.

A measurement which is complementary to a polymer's molecular weight is the melt index (ASTM D-1238). Polymers of high melt index generally have low molecular weight, and vice versa. The polymers of the present invention preferably have a melt index of up to 20 dg/min., more preferably 0.1 to 10 dg/min.

These publications are hereby incorporated by reference for relevant disclosures contained therein relating to the determination of molecular weight.

When the molecular weight of a polymer is greater than desired, it may be reduced by techniques known in the art. Such techniques include mechanical shearing of the polymer employing masticators, ball mills, roll mills, extruders and the like. Oxidative or thermal shearing or degrading techniques are also useful and are known. Details of numerous procedures for shearing polymers are given in U.S. Pat. No. 5,348,673 which is hereby incorporated herein by reference for relevant disclosures in this regard. Reducing molecular weight also tends to improve the subsequent shear stability of the polymer.

The polymer may contain aliphatic, aromatic or cycloaliphatic components, or mixtures thereof. When the polymer is prepared from the monomers, it may contain substantial amounts of olefinic unsaturation, oftentimes far in excess of that which is desired for this invention. The polymer may be subjected to hydrogenation to reduce the amount of unsaturation to such an extent that the resulting hydrogenated polymer has olefinic unsaturation, based on the total number of carbon to carbon bonds in the polymer, of less than 5%, frequently less than 2%, often no more than 1% olefinic unsaturation. As noted hereinabove, the hydrocarbon polymer is olefinically unsaturated. Accordingly, the polymer contains one or more olefinic double bonds. When the polymer is subjected to hydrogenation it is not exhaustively hydrogenated.

Typically, from about 90 to about 99.9% of carbon to carbon bonds in the polymer are saturated.

Aromatic unsaturation is not considered olefinic unsaturation within the context of this invention. Depending on hydrogenation conditions, up to about 20% of aromatic groups may be hydrogenated; however, typically no more than about 5%, usually less than 1% of aromatic bonds are hydrogenated. Most often, substantially none of the aromatic bonds are hydrogenated.

Typically, (A) the olefinically unsaturated polymer contains an average of from 1 to about 9000 olefinic double bonds, more often from about 1 to about 100 olefinic double bonds, even more often from about 1, frequently 2 to about 10, up to about 50 olefinic double bonds per molecule based on the $\overline{M}_n$ of the polymer. In another embodiment, (A) contains about 1 olefinic double bond for about every 20, often for about every 70 to 7000 carbon atoms. In still another embodiment, the hydrocarbon polymer (A) contains about 1 mole of olefinic double bonds for every 4,000 to 20,000 atomic mass units on $\overline{M}_n$ basis, often, about 1 mole of olefinic double bonds per 1,000 to 40,000 atomic mass units on $\overline{M}_n$ basis. Thus, for example, in this embodiment a polymer of $\overline{M}_n$=80,000 would contain from about 2 to about 80 olefinic double bonds per molecule, often from about 4 to about 20 double bonds per molecule. In yet another embodiment, the hydrocarbon polymer (A) contains about 1 mole of olefinic double bonds for about every 300 to 100,000 atomic mass units on $\overline{M}_n$ basis. One mole of olefinic double bonds is an Avogadros number of carbon to carbon double bonds.

In preferred embodiments, the hydrocarbon polymer is at least one oil soluble or dispersible homopolymer or copolymer selected from the group consisting of:

(1) polymers of dienes;

(2) copolymers of conjugated dienes with vinyl substituted aromatic compounds;

(3) polymers of olefins, especially alpha-olefins having from 2 to about 28 carbon atoms;

(4) olefin-diene copolymers; and (5) star polymers.

These preferred polymers are described in greater detail hereinbelow.

(1) Polymers of Dienes

The hydrocarbon polymer may be a homopolymer or copolymer of one or more dienes. The dienes may be conjugated such as isoprene, butadiene and piperylene or non-conjugated such as 1–4 hexadiene, ethylidene norbornene, vinyl norbornene, 4-vinyl cyclohexene, and dicyclopentadiene. Polymers of conjugated dienes are preferred. Such polymers are conveniently prepared via free radical and anionic polymerization techniques. Emulsion techniques are commonly employed for free radical polymerization.

As noted hereinabove, useful polymers have $\overline{M}_n$ ranging from about 20,000 to about 500,000. More often, useful polymers of this type have $\overline{M}_n$ ranging from about 50,000 to about 150,000.

These polymers may be and often are hydrogenated to reduce the amount of olefinic unsaturation present in the polymer. They are not exhaustively hydrogenated.

Hydrogenation is often accomplished employing catalytic methods. Catalytic techniques employing hydrogen under high pressure and at elevated temperature are well-known to those skilled in the chemical art. Other methods are also useful and are well known to those skilled in the art.

Extensive discussions of diene polymers appear in the "Encyclopedia of Polymer Science and Engineering", Volume 2, pp 550–586 and Volume 8, pp 499–532, Wiley-Interscience (1986), which are hereby expressly incorporated herein by reference for relevant disclosures in this regard.

The polymers include homopolymers and copolymers of conjugated dienes including polymers of 1,3-dienes of the formula

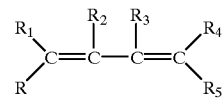

wherein each substituent denoted by R, or R with a numerical subscript, is independently hydrogen or hydrocarbon based, wherein hydrocarbon based is as defined hereinabove. Preferably at least one substituent is H. Normally, the total carbon content of the diene will not exceed 20 carbons. Preferred dienes for preparation of the polymer are piperylene, isoprene, 2,3-dimethyl-1,3-butadiene, chloroprene and 1,3-butadiene.

Suitable homopolymers of conjugated dienes are described, and methods for their preparation are given in numerous U.S. patents, including the following:

U.S. Pat. No. 3,547,821
U.S. Pat. No. 3,835,053
U.S. Pat. No. 3,959,161
U.S. Pat. No. 3,965,019
U.S. Pat. No. 4,085,055
U.S. Pat. No. 4,116,917

As a specific example, U.S. Pat. No. 3,959,161 teaches the preparation of hydrogenated polybutadiene. In another example, upon hydrogenation, 1,4-polyisoprene becomes an alternating copolymer of ethylene and propylene.

Copolymers of conjugated dienes are prepared from two or more conjugated dienes. Useful dienes are the same as those described in the preparation of homopolymers of conjugated dienes hereinabove. The following U.S. Patents describe diene copolymers and methods for preparing them:

U.S. Pat. No. 3,965,019
U.S. Pat. No. 4,073,737
U.S. Pat. No. 4,085,055
U.S. Pat. No. 4,116,917

For example, U.S. Pat. No. 4,073,737 describes the preparation and hydrogenation of butadiene-isoprene copolymers.

(2) Copolymers of Conjugated Dienes with Vinyl Substituted Aromatic Compounds

In one embodiment, the hydrocarbon polymer is a copolymer of a vinyl-substituted aromatic compound and a conjugated diene. The vinyl substituted aromatics generally contain from 8 to about 20 carbons, preferably from 8 to 12 carbon atoms and most preferably, 8 or 9 carbon atoms.

Examples of vinyl substituted aromatics include vinyl anthracenes, vinyl naphthalenes and vinyl benzenes (styrenic compounds). Styrenic compounds are preferred, examples being styrene, alpha-methystyrene, ortho-methyl styrene, meta-methyl styrene, para-methyl styrene, para-tertiary-butylstyrene, with styrene being preferred.

The conjugated dienes generally have from 4 to about 10 carbon atoms and preferably from 4 to 6 carbon atoms. Example of conjugated dienes include piperylene, 2,3-dimethyl-1,3-butadiene, chloroprene, isoprene and 1,3-butadiene, with isoprene and 1,3-butadiene being particularly preferred. Mixtures of such conjugated dienes are useful.

The vinyl substituted aromatic content of these copolymers is typically in the range of about 20% to about 70% by weight, preferably about 40% to about 60% by weight. The aliphatic conjugated diene content of these copolymers is typically in the range of about 30% to about 80% by weight, preferably about 40% to about 60% by weight.

The polymers, and in particular, styrene-diene copolymers, can be random copolymers or block copolymers, which include regular block copolymers or random block copolymers. Random copolymers are those in which the comonomers are randomly, or nearly randomly, arranged in the polymer chain with no significant blocking of homopolymer of either monomer. Regular block copolymers are those in which a small number of relatively long chains of homopolymer of one type of monomer are alternately joined to a small number of relatively long chains of homopolymer of another type of monomer. Random block copolymers are those in which a larger number of relatively short segments of homopolymer of one type of monomer alternate with relatively short segments of homopolymer of another monomer.

The random, regular block and random block polymers used in this invention may be linear, or they may be partially or highly branched. The relative arrangement of homopolymer segments in a linear regular block or random block polymer is obvious. Differences in structure lie in the number and relative sizes of the homopolymer segments; the arrangement in a linear block polymer of either type is always alternating in homopolymer segments.

Normal or regular block copolymers usually have from 1 to about 5, often 1 to about 3, preferably only from 1 to about 2 relatively large homopolymer blocks of each monomer. Thus, a linear regular diblock copolymer of styrene or other vinyl aromatic monomer (A) and diene (B) would have a general structure represented by a large block of homopolymer (A) attached to a large block of homopolymer (B), as:

$$(A)_a(B)_b$$

where a and b are as described hereinbelow. Techniques vary for the preparation of these "A—B—A" and "B—A—B" triblock polymers, and are described in the literature for anionic polymerization.

Similarly, a regular linear tri-block copolymer of styrene or other vinyl aromatic monomer (A) and diene monomer (B) may be represented, for example, by $$(A)_a(B)_b(C)_c.$$

The third monomer (C) may be incorporated into linear, regular block copolymers. Several configurations are possible depending on how the homopolymer segments are arranged with respect to each other. For example, linear triblock copolymers of monomers (A), (B) and (C) can be represented by the general configurations:

$$(A)_a\text{—}(B)_b\text{—}(C)_c, (A)_a\text{—}(C)_c\text{—}(B)b, \text{ or } (B)_b\text{—}(A)_a\text{—}(C)_c,$$

wherein the lower case letters a, b and c represent the approximate number of monomer units in the indicated block.

The sizes of the blocks are not necessarily the same, but may vary considerably. The only stipulation is that any regular block copolymer comprises relatively few, but relatively large, alternating homopolymer segments.

As an example, when (A) represents blocks derived from diene such as isoprene or butadiene, "a" usually ranges from about 100 to about 2000, preferably from about 500 to about 1500; when (B) represents, for example, blocks derived from styrene, "b" usually ranges from about 100 to about 2000, preferably from about 200 to about 1000; and when a third block (C) is present, "c" usually ranges from about 10 to about 1000, provided that the $\overline{M}_n$ of the polymer is within the ranges indicated as useful for this invention.

The copolymers can be prepared by methods well known in the art. Such copolymers usually are prepared by anionic polymerization using Group Ia metals in the presence of electron-acceptor aromatics, or preformed organometallics such as sec-butyllithium as polymerization catalysts.

The styrene/diene block polymers are usually made by anionic polymerization, using a variety of techniques, and altering reaction conditions to produce the most desirable features in the resulting polymer. In an anionic polymerization, the initiator can be either an organometallic material such as an alkyl lithium, or the anion formed by electron transfer from a Group Ia metal to an aromatic material such as naphthalene. A preferred organometallic material is an alkyl lithium such as sec-butyl lithium; the polymerization is initiated by addition of the butyl anion to either the diene monomer or to the styrene.

When an alkyl lithium initiator is used, a homopolymer of one monomer, e.g., styrene, can be selectively prepared, with each polymer molecule having an anionic terminus, and lithium gegenion. The carbanionic terminus remains an active initiation site toward additional monomers. The resulting polymers, when monomer is completely depleted, will usually all be of similar molecular weight and composition, and the polymer product will be "monodisperse" (i.e., the ratio of weight average molecular weight to number average molecular weight is very nearly 1.0). At this point, addition of 1,3-butadiene, isoprene or other suitable anionically polymerizable monomer to the homopolystyrene-lithium "living" polymer produces a second segment which grows from the terminal anion site to produce a living di-block polymer having an anionic terminus, with lithium gegenion.

Subsequent introduction of additional styrene can produce a new poly A-block-poly B-block-poly A, or A—B—A triblock polymer; higher orders of block polymers can be made by consecutive stepwise additions of different monomers in different sequences.

Alternatively, a living diblock polymer can be coupled by exposure to an agent such as a dialkyl dichlorosilane. When the carbanionic "heads" of two A—B diblock living polymers are coupled using such an agent, precipitation of LiCl occurs to give an A—B—A triblock polymer.

Block copolymers made by consecutive addition of styrene to give a relatively large homopolymer segment (A), followed by a diene to give a relatively large homopolymer segment (B), are referred to as poly-A-block-poly-B copolymers, or A—B diblock polymers.

When metal naphthalide is employed as initiator, the dianion formed by electron transfer from metal, e.g., Na, atoms to the naphthalene ring can generate dianions which may initiate polymerization, e.g. of monomer A, in two directions simultaneously, producing essentially a homopolymer of A having anionic termini at both ends.

Subsequent exposure of the poly (A) dianion to a second monomer (B) results in formation of a poly B-block-polyA-block-polyB, or a B—A—B triblock polymeric dianion, which may continue to interact with additional anionically-polymerizable monomers of the same, or different chemical type, in the formation of higher order block polymers. Ordinary block copolymers are generally considered to have up to about 5 such blocks.

In a mixture of monomers, usually one monomer or another will polymerize faster, leading to a segment that is richer in that monomer, interrupted by occasional incorporation of the other monomer. This can be used to build a type of polymer refeired to as a "random block polymer", or "tapered block polymer". When a mixture of two different monomers is anionically polymerized in a non-polar paraffinic solvent, one will initiate selectively, and usually polymerize to produce a relatively short segment of homopolymer. Incorporation of the second monomer is inevitable, and this produces a short segment of different structure. Incoiporation of the first monomer type then produces another short segment of that homopolymer, and the process continues, to give a "random" alternating distribution of relatively short segments of homopolymers, of different lengths. Random block polymers are generally considered to be those comprising more than 5 such blocks. At some point, one monomer will become depleted, favoring incorporation of the other, leading to ever longer blocks of homopolymer, resulting in a "tapered block copolymer."

An alternative way of preparing random or tapered block copolymers involves initiation of styrene, and interrupting with periodic, or step, additions of diene monomer. The additions are programmed according to the relative reactivity ratios and rate constants of the styrene and particular diene monomer.

"Promoters" are electron-rich molecules that facilitate anionic initiation and polymerization rates while lessening the relative differences in rates between various monomers. Promoters also influence the way in which diene monomers are incorporated into the block polymer, favoring 1,2-polymerization of dienes over the normal 1,4-cis- addition.

Hydrogenation of the unsaturated block polymers initially obtained produces polymers having reduced levels of olefinic unsaturation. Hydrogenation techniques are well known to those of skill in the art. One common method is to contact the copolymers with hydrogen, often at superatmospheric pressure in the presence of a metal catalyst such as colloidal nickel, palladium supported on charcoal, etc. Hydrogenation may be carried out as part of the overall production process, using finely divided, or supported, nickel catalyst. Other transition metals may also be used to effect the transformation. Other techniques are known in the art.

These polymers may have considerable olefinic unsaturation, which may be reduced, if desired. Hydrogenation to reduce the extent of olefinic unsaturation may be carried out to reduce approximately 90–99.1% of the olefinic unsaturation of the initial polymer, such that from about 90 to about 99.9% of the carbon to carbon bonds of the polymer are saturated. In general, it is preferred that these copolymers contain no more than about 10%, preferably no more than 5% and often no more than about 0.5% residual olefinic unsaturation on the basis of the total amount of olefinic double bonds present in the polymer prior to hydrogenation. As noted above, the polymers are olefinically unsaturated; accordingly, the polymers are not exhaustively hydrogenated. Unsaturation can be measured by a number of means well known to those of skill in the art, including infrared spectroscopy, nuclear magnetic resonance spectroscopy, bromine number, iodine number, and other means well known to those skilled in the art. Aromatic unsaturation is not considered to be olefinic unsaturation within the context of this invention.

Other polymerization techniques such as emulsion polymerization can be used.

Often the arrangement of the various homopolymer blocks is dictated by the reaction conditions such as catalyst and polymerization characteristics of the monomers employed. Conditions for modifying arrangement of polymer blocks are well known to those of skill in the polymer art. Literature references relating to polymerization techniques and methods for preparing certain types of block polymers include:

1) "Encyclopedia of Polymer Science and Engineering", Wiley-Interscience Publishing, New York, (1986);
2) A. Noshay and J. E. McGrath, "Block Copolymers", Academic Press, New York, (1977);
3) R. J. Ceresa, ed., "Block and Graft Copolymerization", John Wiley and Sons, New York, (1976); and
4) D. J. Meier, ed., (Block Copolymers", MMI Press, Harwood Academic Publishers, New York, (1979).

Each of these is hereby incorporated herein by reference for relevant disclosures relating to block copolymers.

The copolymers preferably have ($\overline{M}_n$) in the range of about 20,000 to about 500,000, more preferably fiom about 30,000 to about 150,000. The weight average molecular weight ($\overline{M}_w$) for these copolymers is generally in the range of about 50,000 to about 500,000, preferably from about 50,000 to about 300,000.

Copolymers of conjugated dienes with olefins containing aromatic groups, e.g., styrene, methyl styrene, etc. are described in numerous patents including the following:

| | |
|---|---|
| 3,554,911 | 4,082,680 |
| 3,992,310 | 4,085,055 |
| 3,994,815 | 4,116,917 |
| 4,031,020 | 4,136,048 |
| 4,073,738 | 4,145,298 |
| 4,077,893 | |

For example, U.S. Pat. No. 3,554,911 describes a random butadiene-styrene copolymer, its preparation and hydrogenation.

(3) Polymers of Olefins

Another useful hydrocarbon polymer is one in which in its main chain is composed essentially of aliphatic olefin, especially alpha olefin, monomers. The polyolefins of this embodiment thus exclude polymers which have a large component of other types of monomers copolymerized in the main polymer backbone, such as ester monomers, acid monomers, and the like. The polyolefin may contain impurity amounts of such materials, e.g., less than 5% by weight, more often less than 1% by weight, preferably, less than 0.1% by weight of other monomers. Useful polymers include oil soluble or dispersible polymers of alpha olefins.

The olefin copolymer preferably has a number average molecular weight ($\overline{M}_n$) determined by gel-permeation chromatography employing polystyrene standards, ranging from about 20,000 to about 500,000, often from about 30,000 to about 300,000, often to about 200,000, more often from about 50,000 to about 150,000, even more often from about 80,000 to 150,000. Exemplary polydispersity values ($\overline{M}_w/\overline{M}_n$) range from about 1.5 to about 3.5, often to about 3.0, preferably, from about 1.7, often from about 2.0, to about 2.5.

These polymers are preferably polymers of alpha-olefins having from 2 to about 28 carbon atoms, preferably copolymers, more preferably copolymers of ethylene and at least one other α-olefin having from 3 to about 28 carbon atoms, i.e., one of the formula $CH_2$=$CHR_1$ wherein $R_1$ is straight chain or branched chain alkyl radical comprising 1 to 26 carbon atoms. Examples include monoolefins such as propylene, 1-butene, isobutene, 1-pentene, 1-hexene, 1-heptene, 1-octene, 1-nonene, 1-decene, etc. Preferably $R_1$ in the above formula is alkyl of from 1 to 8 carbon atoms, and more preferably is alkyl of from 1 to 2 carbon atoms. Preferably, the polymer of olefins is an ethylene-propylene copolymer.

The ethylene content is preferably in the range of 20 to 80 percent by weight, and more preferably 30 to 70 percent by weight. When propylene and/or 1-butene are employed as comonomer(s) with ethylene, the ethylene content of such copolymers is most preferably 45 to 65 percent, although higher or lower ethylene contents may be present. Most preferably, these polymers are substantially free of ethylene homopolymer, although they may exhibit a degree of crystallinity due to the presence of small crystalline polyethylene segments within their microstructure.

In one particular embodiment, the polymer is a homopolymer derived from a butene, particularly, isobutylene. Especially preferred is where the polymer comprises terminal vinylidene olefinic double bonds.

The polymers employed in this embodiment may generally be prepared substantially in accordance with procedures which are well known in the art.

Catalysts employed in the production of the reactant polymers are likewise well known. One broad class of catalysts particularly suitable for polymerization of α-olefins, comprises coordination catalysts such as Ziegler or Ziegler-Natta catalysts comprising a transition metal atom. Ziegler-Natta catalysts are composed of a combination of a transition metal atom with an organo aluminum halide and may be used with additional complexing agents.

Other useful polymerization catalysts are the metallocene compounds. These are organometallic coordination compounds obtained as cyclopentadienyl derivatives of a transition metal or metal halide. The metal is bonded to the cyclopentadienyl ring by electrons moving in orbitals extending above and below the plane of the ring (π bond). The use of such materials as catalysts for the preparation of ethylene-alpha olefin copolymers is described in U.S. Pat. No. 5,446,221. The procedure described therein provides ethylene-alpha olefin copolymers having at least 30% of terminal ethenylidene unsaturation. This patent is hereby incorporated herein by reference for relevant disclosures.

Polymerization using coordination catalysis is generally conducted at temperatures ranging between 20° and 300° C., preferably between 30° and 200° C. Reaction time is not critical and may vary from several hours or more to several minutes or less, depending upon factors such as reaction temperature, the monomers to be copolymerized, and the like. One of ordinary skill in the art may readily obtain the optimum reaction time for a given set of reaction parameters by routine experimentation. Preferably, the polymerization will generally be completed at a pressure of 1 to 40 MPa (10 to 400 bar).

The polymerization may be conducted employing liquid monomer, such as liquid propylene, or mixtures of liquid monomers (such as mixtures of liquid propylene and 1-butene), as the reaction medium. Alternatively, polymerization may be accomplished in the presence of a hydrocarbon inert to the polymerization such as butane, pentane, isopentane, hexane, isooctane, decane, toluene, xylene, and the like.

When carrying out the polymerization in a batch-type fashion, the reaction diluent (if any) and the alpha-olefin comonomer(s) are charged at appropriate ratios to a suitable reactor. Care should be taken that all ingredients are dry, with the reactants typically being passed through molecular sieves or other drying means prior to their introduction into the reactor. Subsequently, component(s) of the catalyst are introduced while agitating the reaction mixture, thereby causing polymerization to commence. Alternatively, component(s) of the catalyst may be premixed in a solvent and then fed to the reactor. As polymer is being formed, additional monomers may be added to the reactor. Upon completion of the reaction, ureacted monomer and solvent are either flashed or distilled off, if necessary by vacuum, and the copolymer withdrawn from the reactor.

The polymerization may be conducted in a continuous manner by simultaneously feeding the reaction diluent (if employed), monomers, component(s) of the catalyst to a reactor and withdrawing solvent, uiireacted monomer and polymer from the reactor so as to allow a residence time of ingredients long enough for forming polymer of the desired molecular weight; and separating the polymer from the reaction mixture.

In those situations wherein the molecular weight of the polymer product that would be produced at a given set of operating conditions is higher than desired, any of the techniques known in the prior art for control of molecular weight, such as the polymerization temperature control, may be used.

The polymers are preferably formed in the substantial absence of added $H_2$ gas, that is $H_2$ gas added in amounts effective to substantially reduce the polymer molecular weight.

The polymers can be random copolymers, block copolymers, and random block copolymers. Ethylene propylene copolymers are usually random copolymers. Block copolymers may be obtained by conducting the reaction in a tubular reactor. Such a procedure is described in U.S. Pat. No. 4,804,794 which is hereby incorporated by reference for relevant disclosures in this regard.

Numerous United States patents, including the following, describe the preparation of copolymers of alpha olefins.

| | |
|---|---|
| 3,513,096 | 4,068,057 |
| 3,551,336 | 4,081,391 |
| 3,562,160 | 4,089,794 |
| 3,607,749 | 4,098,710 |
| 3,634,249 | 4,113,636 |
| 3,637,503 | 4,132,661 |
| 3,992,310 | 4,137,185 |
| 4,031,020 | 4,138,370 |
| 4,068,056 | 4,144,181 |

Copolymers of ethylene with higher alpha olefins are the most common copolymers of aliphatic olefins. Ethylene-propylene copolymers are the most common ethylene-alpha-olefin copolymers and are preferred for use in this invention. A description of an ethylene-propylene copolymer appears in U.S. Pat. No. 4,137,185 which is hereby incorporated herein by reference.

Useful ethylene-alpha olefin, usually ethylene-propylene, copolymers are conmmercially available from numerous sources including the Exxon, Texaco and Lubrizol Corporations.

(4) Olefin-Diene Copolymers

Another useful hydrocarbon polymer is one derived from olefins, especially lower olefins, and dienes. Preferred olefins are alpha olefins. Dienes may be non-conjugated or conjugated, usually non-conjugated. Useful olefins and dienes are the same as those described hereinabove and hereinafter in discussions of other polymer types.

In one embodiment, the copolymer is an ethylene-lower olefin-diene copolymer. As used herein, the term lower refers to groups or compounds containing no more than 7 carbon atoms. Preferably, the diene is non-conjugated Especially preferred are ethylene-propylene-diene copolymers.

These copolymers most often will have $\overline{M}_n$ ranging from about 20,000 to about 500,000, preferably from about 50,000 to about 200,000. In another embodiment, the $\overline{M}_n$ ranges from about 70,000 to about 350,000. These polymers often have a relatively narrow range of molecular weight as represented by the polydispersity value $\overline{M}_w/\overline{M}_n$. Typically, the polydispersity values are less than 10, more often less than 6, and preferably less than 4, often between 2 and 3.

There are numerous commercial sources for lower olefin-diene copolymers. For example, Ortholeum® 2052 (a product marketed by the DuPont Company) which is a terpolymer having an ethylene:propylene weight ratio of about 57:43 and containing 4–5 weight % of groups derived from 1,4-hexadiene monomer. Other commercially available olefin-diene copolymers including ethylene-propylene copolymers with ethylidene norbornene, with dicyclopentadiene, with vinyl norbornene, with 4-vinyl cyclohexene, and numerous other such materials are readily available. Olefin-diene copolymers and methods for their preparation are described in numerous patents including the following U.S. Patents:

U.S. Pat. No. 3,291,780
U.S. Pat. No. 3,300,459
U.S. Pat. No. 3,598,738
U.S. Pat. No. 4,026,809
U.S. Pat. No. 4,032,700
U.S. Pat. No. 4,156,061
U.S. Pat. No. 3,320,019
U.S. Pat. No. 4,357,250

U.S. Pat. No. 3,598,738, which describes the preparation of ethylene-propylene-1,4-hexadiene terpolymers, is illustrative. This patent also lists numerous references describing the use of various polymerization catalysts.

Another useful polymer is an olefin-conjugated diene copolymer. An example of such a polymer is butyl rubber, an isobutylene-isoprene copolymer.

Details of various types of polymers, reaction conditions, physical properties, and the like are provided in the above patents and in numerous books, including:

"Riegel's Handbook of Industrial Chemistry", 7th edition, James A. Kent Ed., Van Nostrand Reinhold Co., New York (1974), Chapters 9 and 10, P. J. Flory, "Principles of Polymer Chemistry", Cornell University Press, Ithaca, N.Y. (1953), "Kirk-Othmer Encyclopedia of Chemical Technology", 3rd edition, Vol. 8 (Elastomers, Synthetic, and various subheadings thereunder), John Wiley and Sons, New York (1979).

Each of the above-mentioned books and patents is hereby expressly incorporated herein by reference for relevant disclosures contained therein.

Polymerization can also be effected using free radical initiators in a well-known process, generally employing higher pressures than used with coordination catalysts. These polymers may be and frequently are hydrogenated to bring unsaturation to desired levels. As noted, hydrogenation may take place before or after reaction with the carboxylic reactant.

(5) Star Polymer

Star polymers are polymers comprising a nucleus and polymeric arms.

Common nuclei include polyalkenyl compounds, usually compounds having at least two non-conjugated alkenyl groups, usually groups attached to electron withdrawing groups, e.g., aromatic nuclei. The polymeric arms are often homopolymers and copolymers of dienes, preferably conjugated dienes, vinyl substituted aromatic compounds such as monoalkenyl arenes, homopolymers of olefins such as butenes, especially isobutene, and mixtures thereof.

Molecular weights (GPC peak) of useful star polymers range from about 20,000 to about 4 million. They frequently have $\overline{M}_n$ ranging from about 100,000 to about 2 million.

The polymers thus comprise a poly(polyalkenyl coupling agent) nucleus with polymeric arms extending outward therefrom. The star polymers are usually hydrogenated such that at least 80% of the covalent carbon-carbon bonds are saturated, more often at least 90% and even more preferably, at least 95% are saturated. As noted herein, the polymers contain olefinic unsaturation; accordingly, they are not exhaustively unsaturated before reaction with the carboxylic reactant.

The polyvinyl compounds making up the nucleus are illustrated by polyalkenyl arenes, e.g., divinyl benzene and poly vinyl aliphatic compounds.

Dienes making up the polymeric arms are illustrated by butadiene, isoprene and the like. Monoalkenyl compounds include, for example, styrene and alkylated derivatives thereof. In one embodiment, the arms are derived from dienes. In another embodiment, the arms are derived from dienes and vinyl substituted compounds. In yet another embodiment, the arms comprise polyisobutylene groups, often, isobutylene-conjugated diene copolymers. Arms derived from dienes are frequently substantially hydrogenated, provided that they are not exhaustively hydrogenated before reaction with the carboxylic reactant.

Star polymers are well known in the art. Such material and methods for preparing same are described in numerous publications and patents, including the following United States patents which are hereby incorporated herein by reference for relevant disclosures contained therein:

U.S. Pat. No. 4,116,917,
U.S. Pat. No. 4,141,847,
U.S. Pat. No. 4,346,193,
U.S. Pat. No. 4,358,565,
and U.S. Pat. No. 4,409,120.

Star polymers are commercially available, for example as Shellvis 200 sold by Shell Chemical Co.

Mixtures of two or more olefinically unsaturated hydrocarbon polymers may be used.

In another embodiment, mixtures of one or more of the olefinically unsaturated hydrocarbon polymers with one or more olefins, other than the olefinically unsaturated hydrocarbon polymers identified as reactant (A) of this invention, may be used. Examples include mixtures of any of the hydrocarbon polymers (A) with lower olefins, such as alpha-olefins containing up to about 100 carbon atoms, polyolefins, for example polyisobutylene, especially high vinylidene polyisobutylene, having molecular weights ranging from about 500 up to about 5,000, ethylene-propylene-diene compounds such as those identified by the tradename Trilene and marketed by Uniroyal Chemical Co., and others. In one embodiment (A) further comprises 1 equivalent carbon to carbon double bonds to about 2 moles of olefinically unsaturated polymer having $\overline{M}_n$ ranging from about 300 to less than 20,000, often less than 10,000, per mole of carbon to carbon double bonds in said olefinically unsaturated polymer having $\overline{M}$ ranging from about 20,000 to about 500,000.

The Catalyst

The process of this invention is optionally conducted in the presence of an acidic catalyst. Acid catalysts, such as organic sulfonic acids, for example, paratoluene sulfonic acid and methane sulfonic acid, heteropolyacids, the complex acids of heavy metals (e.g., Mo, W, Sn, V, Zr, etc.) with phosphoric acids (e.g., phosphomolybdic acid), and mineral acids, for example, $H_2SO_4$ and phosphoric acid, are useful. Solid acidic catalysts are useful. These include materials such as acidic clays, for example $H_2SO_4$ treated diatomaceous earth supplied under the name Super Filtrol, and polymer-bound acids such as those supplied under the name Amberlyst. Among useful solid catalysts are acidic oxides such as $H_2SO_4$ treated $TiO_2$ and $Al_2O_3$. The amount of catalyst used is generally small, ranging from about 0.01 mole % to about 10 mole %, more often from about 0.1 mole % to about 2 mole %, based on moles of olefinic reactant.

(B) The Carboxylic Reactant

The carboxylic reactant is at least one member selected from the group consisting of compounds of the formula $$R^3C(O)(R^4)_nC(O)OR^5 \qquad (IV)$$

wherein each of $R^3$ and $R^5$ is independently H or a hydrocarbyl group, preferably H or lower alkyl, $R^4$ is a divalent hydrocarbylene group, and n is 0 or 1, and reactive sources thereof. Most preferably $R^3$ is H Reactive sources of (B) include compounds of the formula

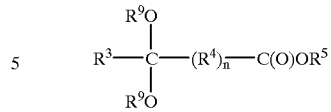

wherein each of $R^3$ and $R^5$ and each $R^9$ is independently H or a hydrocarbyl group, $R^4$ is a divalent hydrocarbylene group, and n is 0 or 1. These include acetals, ketals, hemiacetals and hemiketals of (IV) and esters thereof. Highly preferred are the compounds wherein one of $R^9$ is hydrocarbyl and one is H:

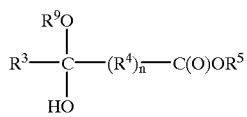

wherein each of $R^3$ and $R^5$ is independently H or a hydrocarbyl group, especially wherein the hydrocarbyl group is lower alkyl. $R^4$ is a divalent hydrocarbylene group, preferably lower alkylene, $R^9$ is hydrocarbyl, preferably lower alkyl, and n is 0 or 1, preferably 0. Especially preferred are the glyoxylate lower alkyl ester, lower alkyl hemiacetals. Cyclic trimers are useful.

Reactant (B) may be a compound of the formula

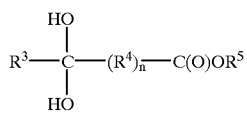

wherein each of $R^3$ and $R^5$ is independently H or alkyl. Such compounds arise when the carboxylic acid or ester reactant is hydrated.

$R^3$ is usuallu H or an aliphatic group, that is, alkyl or alkenyl, preferably alkyl, more preferably lower alkyl. Especially preferred is where $R^3$ is H or methyl, most preferably, H.

$R^4$ is a divalent hydrocarbylene group. This group may be aliphatic or aromatic, but is usually aliphatic. Often, $R^4$ is an alkylene group containing from 1 to about 3 carbon atoms. The 'n' is 0 or 1; that is, in one embodiment $R^4$ is present and in another embodiment, $R^4$ us absent. More often, $r^4$ is absent.

When $R^5$ is hydrocarbyl, it is usually an aliphatic group, often a group containing from 1 to about 30 carbon atoms, often from 8 to about 18 carbon atoms. In another embodiment, $R^5$ is lower alkyl, wherein "lower alkyl" is defined hereinabove. Most often, $R^5$ is H or lower alkyl, especially methyl, ethyl, propyl and butyl.

Examples of carboxylic reactants are glyoxylic acid, and other omega-oxoalkanoic acids, glyoxylic acid hydrate, keto alkanoic acids such as pyruvic acid, levulinic acid, ketovaleric acids, ketobutyric acids, esters thereof, preferably the lower alkyl esters, the hemiacetals and hemiketals of keto- or aldehydoalkanoic acids such as glyoxylic acid and keto alkanoic acids such as pyruvic acid, levulinic acid, ketovaleric acids, and ketobutyric acids, and the corresponding acetals and ketals, and numerous others, including methyl glyoxylate methyl hemiacetal, 4-formylbenzoic acid, 4-formylphenoxyacetic acid, esters thereof, and carboxy benzaldehyde. The skilled worker, having the disclosure before him, will readily recognize the appropriate carboxylic reactant (B) to employ to generate a given intermediate. Preferred carboxylic reactants are those that will lead to preferred products of this invention.

In an especially preferred embodiment, $R^3$ abd $R^9$ are hydrogen and the other $R^9$ and $R^5$ are methyl. In this preferred embodiment, the reactant is represented by the structure

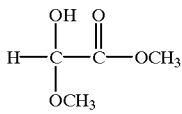

and known as glyoxylic acid methylester methylhemiacetal. It is marketed by DSM Fine Chemicals.

The process of this invention comprises reacting (A) and (B), optionally in the presence of an acidic catalyst, and is conducted at temperatures ranging from ambient up to the lowest decomposition temperature of any of the reactants, usually from about 60° C. to about 250° C., more often from about 100° C. to about 180° C., preferably up to about 160° C. The process employs from about 0.25 to about 4 moles (B) per mole of olefinic double bonds in (A), often from about 0.8 moles to about 1.2 moles (B) per mole of olefinic double bonds in (A), more often from about 0.95 moles to about 1.05 moles (B) per mole of olefinic double bonds in (A).

The process may be conducted in the presence of a diluent, usually an oil of lubricating viscosity. Other diluents may be used; particularly if it is desired to remove the diluent before further use of the product. Such other diluents include relatively low boiling point liquids such as hydrocarbon solvents and the like. The process may be conducted in a kettle type reactor. Under these conditions, it is frequently advantageous to utilize a diluent to improve processing. Alternatively, other reactors may be used. In one particular embodiment, the reactor is an extruder. Usually, processing in an extruder does not require the use of a diluent, although a diluent may be used if desired.

As noted hereinabove, the hydrocarbon polymer may be subjected to hydrogenation to reduce the number of double bonds that are present. When this is done, it is frequently done before reaction with the carboxylic reactant. However, alternatively, a hydrocarbon polymer containing more than the desired number of olefinic bonds may be first reacted with the carboxylic reagent, consuming a portion of the olefinic bonds, then the adduct may be subjected to hydrogenation to reduce the number of remaining, unreacted, double bonds.

The following examples are intended to illustrate several compositions of this invention as well as means for preparing same. Unless indicated otherwise all parts are parts by weight. It is to be understood that these examples are intended to illustrate several compositions and procedures of the invention and are not intended to limit the scope of the invention.

EXAMPLE 1

A reactor equipped with a stirrer, $N_2$ inlet, and thermocouple is charged with 5950 parts of a 100N mineral oil (Petro-Canada) followed by heating, under $N_2$, to 160° C. To the heated oil 1050 parts of an ethylene-propylene-dicyclopentadiene copolymer having about 51 mole % ethylene groups and 2 mole % dicyclopentadiene groups, about one carbon to carbon double bond per 7300 molecular weight units, is added, over 3 hours while maintaining 160° C. and $N_2$, then mixed for about 12 hours at 160° C. with $N_2$. Another reactor equipped with a stirrer, thermocouple, and Dean-Stark trap fitted with a condenser and $N_2$ inlet is charged with 2800 parts of the polymer solution. The contents of the reactor are heated to 110° C. whereupon 11.2 parts methyl glyoxylate methyl hemiacetal, 1.96 parts methanesulfonic acid and 2 drops of silicone antifoam are added followed by mixing and heating to 145° C. over 0.75 hour and then heating at temperature for 6 hours. The materials are stripped at 145° C. at 12–15 mm Hg for 1 hour.

EXAMPLE 2

A reactor equipped with a stirrer, $N_2$ inlet, and thermocouple is charged with 300 parts of the ethylene-propylene-dicyclopentadiene copolymer in oil solution of Example 1 which is then heated, under $N_2$, to 90° C., whereupon are added 0.28 parts methyl glyoxylate methyl hemiacetal and 2 drops methane sulfonic acid. The temperature is increased to 130° C. over 0.3 hour then to 135° C. where the temperature is maintained for 4 hours with stirring.

EXAMPLE 3

The process of Example 1 is repeated replacing methyl glyoxylate methyl hemiacetal with an equivalent amount of 50% aqueous glyoxylic acid, removing water during the reaction.

EXAMPLE 4

The process of Example 1 is repeated replacing glyoxylic acid with an equivalent amount of levulinic acid.

EXAMPLE 5

A reactor equipped with a stirrer, $N_2$ inlet, and thermocouple is charged with 300 parts of the ethylene-propylene-dicyclopentadiene copolymer in oil solution of Example 1, 1.2 parts methyl glyoxylate methyl hemiacetal and 3 drops methane sulfonic acid. The materials are mixed and heated to 145° C., under $N_2$, for 3 hours. The materials are stripped at 15 mm Hg at 145° C. for 1 hour.

EXAMPLE 6

The procedure of Example 5 is repeated except 2.4 parts methyl glyoxylate methyl hemiacetal are used.

EXAMPLE 7

A reactor equipped with a stirrer, $N_2$ inlet, and thermocouple is charged with 300 parts of the ethylene-propylene-dicyclopentadiene copolymer in oil solution of Example 1 and 1.2 parts methyl glyoxylate methyl hemiacetal which are mixed thoroughly. To this are added 0.21 part methane sulfonic acid and the materials are mixed. The materials are heated to 145° C. then are held at temperature for 6 hours. The materials are stripped at 15 mm Hg at 145° C. for 1 hour.

EXAMPLE 8

The procedure of Example 7 is repeated except all ingredients are charged before mixing.

EXAMPLE 9

The procedure of Example 5 is repeated employing 700 parts of the polymer in oil solution of Example 1, 2.8 parts methyl glyoxylate methyl hemiacetal and 0.49 part methane sulfonic acid.

EXAMPLE 10

The procedure of Example 1 is repeated except that after reaction and before stripping, the materials are mixed with an additional 200 parts of the 100N mineral oil.

EXAMPLE 11

A reactor equipped with a stirrer, $N_2$ inlet, and thermocouple is charged with 1500 parts of the ethylene-propylene-dicyclopentadiene copolymer in oil solution of Example 1 which is then heated, under $N_2$, to 130° C. To the heated oil solution are added 6 parts methyl glyoxylate methyl hemiacetal and 1.06 parts methane sulfonic acid, the temperature is increased to 145° C. and is held there for 5 hours followed by stripping at 15 mm Hg and 145° C. for 1 hour.

EXAMPLE 12

A reactor is charged with 500 parts of an 89.5% oil solution of a terpolymer having ethylene:propylene ratio of about 57:43 by weight and containing about 4–5% by weight 1–4 hexadiene units and on neat basis, average molecular weight of about 1800 per carbon to carbon double bond (Ortholeum 2052, DuPont) and 50 parts of 50% aqueous glyoxylic acid. The materials are heated, under $N_2$, at 150–200° C. for 8 hours while collecting 36 parts of distillate in a Dean-Stark trap. The product is filtered at 190–200° C. yielding a material having saponification No =2.74 and which shows infra-red absorption at 1760–1785 $cm^{-1}$.

EXAMPLE 13

Following essentially the procedure of Example 12, 500 parts of Ortholeum 2052 and 25 parts glyoxylic acid hydrate are heated at 190–200° C. for 8 hours the filtered at 180° C. yielding a material having saponification no =9.9, neutralization number (phenolphthalein indicator) 1.9 and which has infrared absorption at 1760–1780 $cm^{-1}$.

EXAMPLE 14

Part A

A solution of 130 parts of a styrene-butadiene random block copolymer having molecular weight of about 200,000 and which has been hydrogenated to the extent of removing about 95% of its olefinic unsaturation, in 1170 parts Petro-Canada 100N oil is prepared by mixing the two materials, under $N_2$, for 6 hours at 130° C.

Part B

A reactor is charged with 400 parts of the oil solution of Part A of this Example, 1.07 parts methyl glyoxylate methyl hemiacetal and 0.20 parts methane sulfonic acid. Under $N_2$, the materials are heated to 145° C. and held there for 5 hours. After heating, the materials are vacuum stripped for 0.2 hour at 20 mm Hg.

EXAMPLE 15

A reactor is charged with 400 parts of the oil solution of Part A of Example 14 and 1.07 parts methyl glyoxylate methyl hemiacetal. The materials are heated to 145° C. and are held there, under $N_2$, for 5 hours. After heating, the materials are vacuum stripped at 20 mm Hg for 0.3 hour.

EXAMPLE 16

The procedure of Example 14 is repeated replacing the random block styrene-butadiene copolymer with a tapered block styrene-butadiene copolymer of essentially the same molecular weight and degree of hydrogenation.

EXAMPLE 17

The procedure of Example 14 is repeated replacing the random block styrene-butadiene copolymer with a butyl rubber identified as a copolymer of isobutylene (98.5 mole %) and isoprene (1.5 mole %) having a viscosity average molecular weight of 450,000 and mole % unsaturation of about 2%.

EXAMPLE 18

Following substantially the procedure of Example 1, a 15% in oil solution of an ethylene-propylene-cyclopentadiene copolymer as used in Example 1 but having $M_w$ about 25,000 lower is prepared. and 2800 parts of the oil solution is reacted with 11.2 parts methyl glyoxylate methyl hemiacetal.

EXAMPLE 19

A reactor is charged with 1000 parts of the oil solution of Example 1 and 100 parts of a polyisobutylene ($\overline{M}_n$ 1000) having about 70% terminal vinylidene groups. The materials are mixed and heated to 110° C. whereupon 5 parts of methyl glyoxylate, methyl hemiacetal and 0.6 parts methanesulfonic acid are added. The materials are reacted at 160° C., under $N_2$, for 6 hours then stripped at 145° C. and 13 mm Hg for 1 hour.

EXAMPLE 20

An ethylene-propylene-dicyclopentadiene (63:37:1.5) weight copolymer (Uniroyal) is dissolved in Petro Canada 100N oil to prepare a solution containing 14% by weight copolymer. Following substantially the procedure of Example 1, 700 parts of the oil solution are reacted with 2.61 parts methyl glyoxylate methyl hemiacetal in the presence of 0.25 parts methane sulfonic acid. The theoretical saponification no.=1.75.

EXAMPLE 21

The procedure of Example 20 is repeated employing 0.5 parts methane sulfonic acid.

EXAMPLE 22

The procedure of Example 20 is followed except the polymer in oil solution further contains 0. 1% by weight 2,6-di-t-butyl-p-cresol.

EXAMPLE 23

The procedure of Example 21 is repeated employing the polymer in oil solution of Example 22.

EXAMPLE 24

The procedure of Example 22 is repeated using 2.1 parts methyl glyoxylate methyl hemiacetal.

EXAMPLE 25

The procedure of Example 20 is repeated with 575 parts of the copolymer in oil solution, 1.606 parts methyl glyoxylate methyl hemiacetal and 0.3836 parts methane sulfonic acid. To reduce foaming, 0.0485 parts of a kerosene solution of a silicone antifoam agent is employed.

EXAMPLE 26

Part A

Following essentially the procedure of Example 1, an oil solution is prepared from 15 parts of an ethylene-propyleneethylene norbornene copolymer having an ethylene-propylene weight ratio of about 52: 48 and containing about 4 weight % of groups derived from ethylene norbornene, weight average molecular weight of about 180,000 (polystyrene standard) and equivalent weight based on C=C of about 23,000, and 85 parts of 100 neutral mineral oil.

Part B

A reactor is charged with 800 parts of the oil solution of Part A of this example. The solution is heated, under $N_2$, to 120° C. whereupon 4.2 parts glyoxylic acid methyl ester, methyl hemeacetal (GMHA) are added followed by heating to 145° C. The temperature is maintained for 6 hours, then the batch is vacuum stripped (145° C./15 mm Hg).

EXAMPLE 27

The procedure of Example 26, Part B is repeated employing 4 drops of methane sulfonic acid during the reaction.

EXAMPLE 28

The procedure of Example 27 is repeated employing 2,000 parts of the polymer in oil solution, 10.4 parts of GMHA and 10 drops methane sulfonic acid.

While the invention has been explained in relation to its preferred embodiments, it is to be understood that various modifications thereof will become apparent to those skilled in the art upon reading the specification. Therefore, it is to be understood that the invention disclosed herein is intended to cover such modifications that fall within the scope of the appended claims.

What is claimed is:

1. A composition comprising the reaction product of
   (A) at least one olefinically unsaturated hydrocarbon polymer having $\overline{M}_n$ ranging from about 20,000 to about 500,000, when the polymer is not a star polymer, and up to about GPC peak molecular weight of 4,000,000 when the polymer is a star polymer, with
   (B) at least one carboxylic reactant selected from the group consisting of compounds of the formula

   $$R^3C(O)(R^4)_nC(O)OR^5 \qquad (IV)$$

wherein each of $R^3$ and $R^5$ is independently H or a hydrocarbyl group, $R^4$ is a divalent hydrocarbylene group, and n is 0 or 1, and reactive sources thereof.

2. The composition of claim 1 wherein at least one reactant (B) is glyoxylic acid or the hydrate thereof.

3. The composition of claim 1 wherein at least one reactant (B) is a compound of the formula

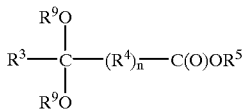
$$\begin{array}{c} R^9O \\ | \\ R^3\!-\!\!\overset{}{C}\!-\!(R^4)_{\overline{n}}\!-\!C(O)OR^5 \\ | \\ R^9O \end{array} \qquad (VI)$$

wherein each of $R^3$ and $R^5$ and each $R^9$ is independently H or a hydrocarbyl group, $R^4$ is a divalent hydrocarbylene group, and n is 0 or 1.

4. The composition of claim 3 wherein one $R^9$ is hydrocarbyl and one $R^9$ is H.

5. The composition of claim 4 wherein at least one reactant (B) is a lower alkyl glyoxylate, lower alkyl hemiacetal.

6. The composition of claim 5 wherein (B) is methyl glyoxylate, methyl hemiacetal.

7. The composition of claim 1 wherein at least one reactant (B) is a lower alkyl ester of glyoxylic acid.

8. The composition of claim 1 wherein (A) the olefinically unsaturated polymer contains an average of from about 1 to about 9000 olefinic double bonds per molecule based on the $\overline{M}_n$ of the olefinically unsaturated polymer.

9. The composition of claim 8 wherein (A) contains from about 1 to about 100 olefinic double bonds per molecule based on the $\overline{M}_n$ of the olefinically unsaturated polymer.

10. The composition of claim 1 wherein (A) contains 1 olefinic double bond per every 20 to about 7,000 carbon atoms.

11. The composition of claim 1 characterized by the presence within its structure of an average of about 0.25 to about 4 groups derived from (B) per mole of olefinic double bonds in (A).

12. The composition of claim 1 wherein the olefinically unsaturated hydrocarbon polymer is at least one member selected from the group consisting of:
    (1) polymers of dienes;
    (2) copolymers of conjugated dienes with vinyl substituted aromatic compounds;
    (3) polymers of aliphatic olefins having from 2 to about 28 carbon atoms;
    (4) olefin-diene copolymers; and
    (5) star polymers.

13. The composition of claim 12 wherein from about 90% to about 99.9% of the olefinic double bonds of the polymer are saturated.

14. The composition of claim 12 wherein the hydrocarbon polymer is (1) a polymer of dienes, wherein the diene comprises a conjugated diene selected from the group consisting of isoprene, butadiene, and piperylene.

15. The composition of claim 12 wherein the hydrocarbon polymer is (2) a copolymer of a conjugated diene with a vinyl substituted aromatic compound, wherein the vinyl substituted aromatic compound is a styrenic compound.

16. The composition of claim 15 wherein the conjugated diene is selected from the group consisting of isoprene, butadiene, and piperylene.

17. The composition of claim 16 wherein the diene is selected from the group consisting of isoprene and 1,3-butadiene and the styrenic compound is styrene.

18. The composition of claim 17 wherein the hydrocarbon polymer is a block copolymer.

19. The composition of claim 12 wherein the hydrocarbon polymer is (3) a polymer of alpha-olefins having from 2 to about 28 carbon atoms, wherein the aliphatic olefins comprise alpha-olefins.

20. The composition of claim 19 wherein the polymer is a copolymer and the alpha-olefins comprise ethylene and at least one alpha olefin having from 3 to about 28 carbon atoms.

21. The composition of claim 20 wherein the hydrocarbon polymer is an ethylene-propylene copolymer.

22. The composition of claim 19 wherein the aliphatic olefin comprises a butene.

23. The composition of claim 22 wherein the polymer comprises terminal ethenylidene or vinylidene olefinic double bonds.

24. The composition of claim 12 wherein the hydrocarbon polymer is (4) an olefin-diene copolymer wherein the olefin comprises alpha olefins.

25. The composition of claim 24 wherein the olefin comprises ethylene and propylene and the diene is a non-conjugated diene.

26. The composition of claim 25 wherein the diene is selected from the group consisting of 1,4-hexadiene, dicyclopentadiene, ethylidene norbornene, vinyl norbornene, and 4-vinyl cyclohexene.

27. The composition of claim 12 wherein the hydrocarbon polymer is (4) an olefin-diene copolymer wherein the diene is a conjugated diene.

28. The composition of claim 27 wherein the hydrocarbon polymer is a butyl rubber.

29. The composition of claim 12 wherein the hydrocarbon polymer is (5) a star polymer, wherein the $\overline{M}_n$ ranges from about 100,000 to about 2 million.

30. The composition of claim 12 wherein the hydrocarbon polymer is (5) a star polymer wherein the arms are derived from dienes.

31. The composition of claim 30 wherein the arms are derived from dienes and vinyl substituted aromatic compounds.

32. The composition of claim 12 wherein the hydrocarbon polymer is a (5) a star polymer wherein the arms comprise polyisobutylene groups.

33. The composition of claim 32 wherein the arms comprise isobutylene-conjugated diene copolymers.

34. The composition of claim 30 wherein the arms are substantially hydrogenated.

35. A process consisting of reacting, optionally in the presence of an acid catalyst, a mixture comprising (A) an olefinically unsaturated hydrocarbon polymer having $\overline{M}_n$ ranging from about 20,000 to about 500,000 when the polymer is not a star polymer, and up to about GPC peak molecular weight of 4,000,000 when the polymer is a star polymer, with (B) at least one carboxylic reactant selected from the group consisting of compounds of the formula

$$R^3C(O)(R^4)_nC(O)OR^5 \quad (IV)$$

wherein each of $R^3$ and $R^5$ is independently H or a hydrocarbyl group, $R^4$ is a divalent hydrocarbylene group, and n is 0 or 1, and reactive sources thereof.

36. The process of claim 35 wherein (A) further comprises from about 1 equivalent carbon to carbon double bonds to about 2 moles of olefinically unsaturated polymer having $\overline{M}_n$ ranging from about 300 to less than 20,000 per mole of carbon to carbon double bonds in said olefinically unsaturated polymer having $\overline{M}$ ranging from about 20,000 to about 500,000.

37. The process of claim 35 wherein the reacting is conducted at a temperature ranging from about 60° C. to about 250° C.

38. The process of claim 35 wherein from about 0.25 to about 4 moles of (B) are reacted with each mole of olefinic double bonds in (A).

39. The process of claim 35 wherein (B) is at least one member selected from the group consisting of a glyoxylic acid, a lower alkyl ester of glyoxylic acid and a lower alkyl glyoxylate, lower alkyl hemiacetal.

40. The process of claim 35 wherein the olefinically unsaturated hydrocarbon polymer is at least one member selected from the group consisting of:

(1) polymers of dienes;

(2) copolymers of conjugated dienes with vinyl substituted aromatic compounds;

(3) polymers of aliphatic olefins having from 2 to about 28 carbon atoms;

(4) olefin-diene copolymers; and (5) star polymers.

41. The process of claim 35 conducted in an extruder.

42. A product prepared by the process of claim 35.

43. A product prepared by the process of claim 41.

* * * * *